United States Patent
Heinonen et al.

(10) Patent No.: US 6,289,313 B1
(45) Date of Patent: Sep. 11, 2001

(54) METHOD, DEVICE AND SYSTEM FOR ESTIMATING THE CONDITION OF A USER

(75) Inventors: Pekka Heinonen; Harri Okkonen, both of Espoo; Jukka Ranta, Salo, all of (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/338,205

(22) Filed: Jun. 22, 1999

(30) Foreign Application Priority Data

Jun. 30, 1998 (FI) .................................................... 981508

(51) Int. Cl.[7] .................................................. G10L 15/00
(52) U.S. Cl. .......................... 704/270; 704/219; 704/223; 600/301
(58) Field of Search .................................... 704/223, 200, 704/219, 270, 271, 275, 207; 600/300, 301

(56) References Cited

U.S. PATENT DOCUMENTS

| | | | |
|---|---|---|---|
| 3,971,034 | * 7/1976 | Bell, Jr. | 704/270 |
| 4,093,821 | * 6/1978 | Williamson | 704/275 |
| 4,142,067 | * 2/1979 | Williamson | 704/275 |
| 5,557,639 | 9/1996 | Heikkila et al. | 375/224 |
| 5,596,677 | 1/1997 | Jarvinen et al. | 395/2.29 |
| 5,835,889 | 11/1998 | Kapanen | 704/215 |
| 5,854,978 | 12/1998 | Heidari | 455/418 |
| 5,893,061 | 4/1999 | Gortz | 704/262 |
| 6,006,188 | * 12/1999 | Bogdashevsky et al. | 704/270 |

FOREIGN PATENT DOCUMENTS

| | | |
|---|---|---|
| 0325075 A1 | 7/1989 | (EP) . |
| 2151113A | 7/1985 | (GB) . |
| WO 97/28736 | 8/1997 | (WO) . |

OTHER PUBLICATIONS

ETS Draft 300 961 "Digital cellular telecommunications system (Phase 2+); Full rate speech; Transcoding" (GSM 06.10 version 5.1.0).

"Numerical Recipes in C: The Art of Scientific Computing" $2^{nd}$ edition, Press et al., Cambridge University Press, pp. 59–70).

"The Electrical Engineering Handbook", CRC Press, 1993, pp. 420–423.

Patent Abstracts of Japan, Publication No. JP 5023324.

* cited by examiner

Primary Examiner—Richemond Dorvil
Assistant Examiner—Daniel Abebe
(74) Attorney, Agent, or Firm—Perman & Green, LLP

(57) ABSTRACT

An improved method for estimating the status of human physiological and/or psychological conditions by observing the values of the vocal tract parameters output from a digital speech encoder. The user (40) speaks to his device (41), which transforms the input speech from analog to digital form, performs speech encoding (42) on the derived digital signal, and provides values of speech coding parameters (43) locally for further analysis. The stored mathematical relation, e.g. the user-specific vocal tract transformation matrix (47) is retrieved from the memory and utilized in the calculation of corresponding condition parameters (45). Based on these calculated parameters, an estimation (48) of the present status of user's condition can be derived (48).

22 Claims, 6 Drawing Sheets

METHOD, DEVICE AND SYSTEM FOR ESTIMATING THE CONDITION OF A USER

BACKGROUND OF THE INVENTION

This invention relates to a method, device and system for estimating the status of at least one of a physiological and psychological condition of a human being.

Asthma is generally defined as a chronic inflammatory disorder of the airways in which many cells and cellular elements play a role, in particular mast cells, eosinophils, T lymhocytes, macrophages, neutrophils and epithelial cells. In susceptible individuals, this inflammation causes recurrent episodes of wheezing, breathlessness, chest tightness and coughing, particularly at night or in the early morning. These episodes are usually associated with widespread but variable airflow obstruction that is often reversible either spontaneously or with treatment. The inflammation also causes an associated increase in the existing bronchial hyperresponsiveness to a variety of stimuli.

Individuals with asthma have to follow their pulmonary functions regularly and adjust their medication accordingly. To enable this, certain parameters to describe the status of pulmonary function, and measurement devices to indicate the current values of these parameters have been developed. At present, measurements of these parameters are carried out through observing the characteristics of the inhalation and exhalation of the person. An adequate definition of the status of asthma symptoms generally requires a full spirometer analysis, which indicates the values of several pulmonary parameters, but this usually cannot be accomplished regularly on a daily basis. A simple measurement device is a PEF meter, indicating the Peak Expiratory Flow of the pulmonary tract, which device some asthma patients constantly carry with them. A single PEF value, anyhow, gives only a limited picture of the status of asthma symptoms, and the analysis of the measured value relies solely on the personal capacities of the individual in question. Furthermore, it is not very convenient to carry an extra device with oneself, nor is it always easy to find the time and the place to carry out the measurements in a discrete way.

Like in the asthma case, monitoring of many human conditions require test conditions and use of dedicated test equipment. For this reason frequent, long-term monitoring of such conditions is generally not available, except perhaps for a scattered test group of chosen people.

SUMMARY OF THE INVENTION

It is an object of the present invention to address the limitations of the prior art and to offer an improved method for estimating the status of human physiological and/or psychological conditions.

The present invention uses a new approach where characteristics and transitions of said human physiological and/or psychological conditions are monitored by observing the values of the vocal tract parameters output from a digital speech encoder. According to the present invention, a method for estimating the status of at least one of a physiological and psychological condition is presented. The method is characterized by taking speech samples from the user and processing said samples into an input audio signal; generating a set of values of speech coding parameters from said input audio signal, said speech coding parameters representing characteristics of said input audio signal; applying a user specific mathematical relation to calculate the values of said condition parameters from said set of values of speech coding parameters; and estimating the status of said condition based on said calculated values of said condition parameters.

According to another aspect of the invention a device for estimating the status of at least one of a physiological and psychological condition is presented. The device is characterized in that it comprises input means for receiving input speech and transforming it into input audio signal; a speech encoder for generating a set of values of speech coding parameters from said input audio signal, said speech coding parameters representing characteristics of said input audio signal; a memory for storing data on a user-specific mathematical relation between parameters of said condition and speech parameters; a processor for applying said user-specific mathematical relation to calculate values of said condition parameters from said set of values of speech coding parameters; and output means for providing the resulting calculated values of certain condition parameters for estimation of the status of the user's condition.

According to the third aspect of the invention a system for estimating the status of at least one of a physiological and psychological condition is presented. The system is characterized in comprising: a plurality of monitoring devices comprising input means for receiving input speech and transforming it into input audio signal, and a speech encoder for generating a set of values for speech coding parameters from said input audio signal, said speech coding parameters representing characteristics of said input audio signal; a central monitoring unit comprising a database for storing data on a user-specific mathematical relation between said condition parameters and speech parameters, separately defined for each user, a processing unit for, as a response to a received set of values for certain speech coding parameters, retrieving the user-specific mathematical relation from the database and applying said relation to calculate the values of chosen condition parameters from said set of values for chosen speech parameters; an estimation unit for, as a response to the calculated values of chosen condition parameters, producing an estimate on the status of condition of the user.

It is appreciated that human speech gives information on at least two levels. In addition to the information of spoken words, the characteristics of the speaker's voice give many intentional and unintentional indications to the listener. By careful monitoring, different conditions associated with e.g. agitation, breathlessness, tiredness, confusion etc. can be noticed from the way the person talks. It is evident, that the present invention represents a considerable advancement over prior art solutions in many respects. A high-quality digital speech encoder is already available in modem cellular phones, which enable a large variety of monitoring solutions integrated to a device already at hand. Therefore, an easy and inexpensive way of self-monitoring can be provided for a large group of users.

For example, with the invention the user having asthma is relieved from purchasing and carrying a dedicated system merely for asthma-monitoring purposes. Taking a measurement in a conventional way by blowing to a device is preferably carried out in privacy. With the invented device, the measurement can be carried out practically anytime and anywhere, since the measurement can essentially be implemented by uttering words to a device e.g. using a cellular phone in a normal way, and talking to a mobile phone in a public place is very common nowadays. Furthermore, the mapping of pulmonary function parameters to vocal tract parameters can relatively easy be realized for several parameters, which widens the scope of possible daily analysis from one or a few PEF measurements to a more extensive report on functional features of the vocal tract.

A cellular phone itself offers considerable processing and memory means for analyzing and storing the measured data. Furthermore, the communication link provided by the cellular network provides an immediate access to practically infinite resources of data processing means, which can be utilized for collecting and monitoring data of the user. For example, the measurement data can be transmitted right away and even automatically to a database, where it can be examined by other people involved with monitoring, and critical values may even trick an immediate support or rescue processes of the healthcare authorities. The measured data can also be continually collected in order to monitor the long-term development of the status of user's condition.

BRIEF DESCRIPTION OF THE DRAWINGS

The invention will now be described, by way of example only, with reference to the accompanying figures, of which.

DETAILED DESCRIPTION

Notwithstanding other forms of the invention, the principles of the invented method, device and system are described in connection of a first embodiment, which comprises monitoring the pulmonary functions of a person.

In the modem advanced speech coding methods the speech encoder based on the input audio signals essentially creates a model of the speaker's vocal tract. Such speech coding is utilized e.g. digital cellular transceivers, where only the generated model parameters with some additional correction terms are transmitted over the network to the receiver. At the receiver, the vocal tract parameters are forwarded into a speech decoder that regenerates the speech. A codec is a term used to describe a functional element comprising an encoder and a decoder, the encoder being used to define values for speech coding parameters, that represent features of the input audio signal and with which the input speech can later be reproduced by a decoder.

Figure 1:
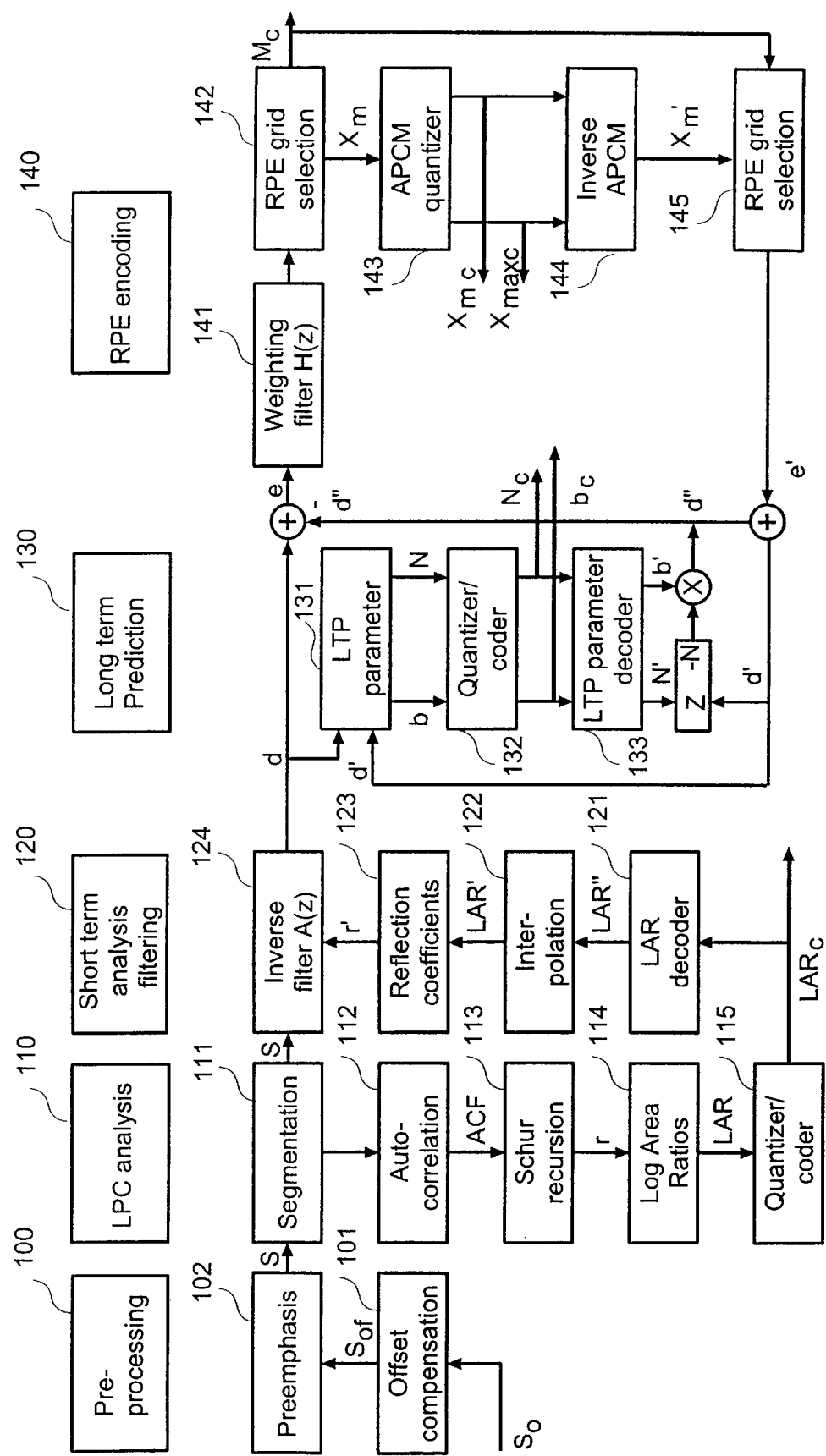
FIG. 1 shows a block diagram of a state of the art RPE-LTP (Regular Pulse Excited Coding with Long Term Prediction) speech encoder.

As an example of a speech encoder working on said principle and of the process of generating speech coding parameters, FIG. 1 shows a functional block diagram of a RPE-LTP (Regular Pulse Excited Coding with Long Term Prediction) speech encoder used e.g. in GSM (Global System for Telecommunications) tranceivers. A more detailed description of RPE-LTP-codecs can be found in the European Telecommunications Standards Insitute (ETSI) publication "GSM Digital cellular telecommunication system; Full rate speech; Transcoding (GSM 06.10 version 5.1.0)."

The speech-encoder of FIG. 1 can be roughly divided into five main sections: pre-processing 100, Linear Predictive Coding Analysis 110 (LPC), Short term analysis filtering section 120, LTP-analysis 130 and RPE encoding 140.

In the pre-processing phase 100, the sampled speech is processed by an offset compensation 101 filter, since many AD-converters have significant offset that easily decreases resolution of LPC-parameter computation. Most of the power of the speech signal is located at frequencies below 1 kHz, and hence, to improve analysis of higher frequency components, speech signal is pre-emphasized 102 with e.g. high pass filter.

In LPC -analysis block 110 the speech signal s is divided into non-overlapping 20 ms frames (segmentation 111). A new LPC-analysis of order 8 is performed for each frame by calculating first the nine values of the autocorrelation function (autocorrelation 112) and deriving the reflection coefficients thereupon using the Schur Recursion algorithm (Schur recursion 113). The term "reflection coefficient" comes from the theory of linear prediction of speech, where vocal tract representation consisting of series of uniform cylindrical sections is assumed. Such a representation can be described by the reflection coefficients or the area ratios of connected sections. The reflection coefficients are then converted into logarithmic presentation (Log Area Ratios 114), since the resulting logarithmic area ratios (LAR) are less sensitive for quantization errors. The converted coefficients are limited and quantized (Quantizer/coder 115) and as a result a set of eight LPC-coefficients ($LAR_c$) are defined.

In the first step of short term analysis filtering 120 the quantized and coded logarithmic area ratios $LAR_c$ are decoded (LAR decoder 121). To avoid spurious transients which may occur if the filter coefficients are changed abruptly, two subsequent sets of logarithmic area ratios are interpolated linearly (Interpolation 122). The interpolated logarithmic area ratios LAR' are used for inverse Schur transformation to produce calculated reflection coefficients (Reflection coefficients 123). The current frame of speech signal s has been retained in memory until calculated LPC parameters $LAR_c$ are defined. When the calculation is finished the current frame is fed together with the calculated reflection coefficients to the short term analysis filter to produce the short term residual signal d (Inverse filter A(z) 124).

Each frame of the short term residual signal d contains 160 samples, corresponding to 20 ms. In the Long-Term Predicotr section 130 the long term correlation is evaluated four times per frame, for each 5 ms subsegment. For each subsegment a long term correlation lag $N_c$ and an associated gain factor $b_c$ are determined (LTP parameter 131) based on the evaluation of the cross-correlation of the current subsegment of short term residual signal d and the previous reconstructed short term residual signal d'. The coded and quantized parameters (Quantizer/coder 132) are decoded (LTP parameter decoder 133) and used with the reconstructed short term residual samples d' to compute the estimated samples d", which are subtracted from the short term resiudual signal d to yield long term residual signal e, which is to be fed to the following step of RPE encoding 140.

The residual signal e is first weighted by a FIR block filter algorithm by convolving 40 samples with a chosen impulse response H(z) (Weighting filter H(z) 141). Said residual is down-sampled by a ratio of 3 resulting in 3 interleaved sequences, which are split up again into subsequences $x_m$ of length 13. According to the explicit solution of the RPE mean squared error criterion, the optimum candidate subsequence $x_M$ with the maximum energy is selected, which yield the related optimum grid position $M_c$ (RPE grid selection, 142). The selected sequence with maximum energy $x_M$ is quantized applying Adaptive Pulse Coded Modulation (APCM quantizer 143). For each RPE sequence the maximum $x_{max}$ of the absolute values $|x_M|$ is selected and quantized logarithmically as $x_{maxc}$. The 13 samples are normalized and quantized to yield a coded subsequence $x_{mc}'$. The obtained parameters are decoded and denormalized (Inverse APCM 144) to give the decoded subsequence $x'_m$, which is further up-sampled by a ratio of 3 by inserting zero values according to the grid position given with $M_c$ (RPE grid position 145).

Consequently, the relevant parameters to model the input speech in described RPE-LTP-encoder are: 8 LPC-coefficients LARc (36 bits/20 ms), LTP lag $N_c$ (7 bits /5 ms), LTP gain $b_c$ (2 bits/5 ms) RPE-excitation $x_{mc}$ (13 pulses·3 bits/5 ms), excitation phase $M_c$ (2 bits/5 ms), excitation gain $X_{maxc}$ (6 bits/5 ms), excitation gain $X_{maxc}$ (6 bits/5 ms), which in transmission would result in a total bit rate of 13 kbit/s.

Figure 2:
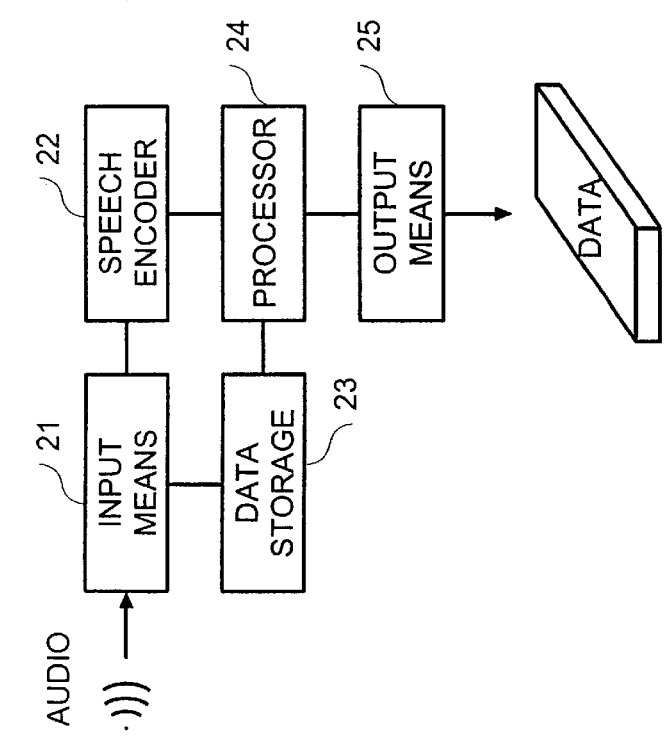
FIG. 2 shows a block diagram illustrating the principle of the invention.

Referring to FIG. 2, a basic configuration for utilizing a speech encoder in the invented manner is shown. In addition to a speech encoder 21, input means 22 for receiving speech from the user and for processing it ready for inputting to the speech encoder are needed. A storage of data 23 containing information on A user-specific mathematical relation between the pulmonary function parameters and the vocal tract parameters from the speech encoder, and a processor 24 to apply said relation to utilize the values of generated vocal tract parameters are also needed. Via output means 25 the results generated by the processor 24 are output for estimation of pulmonary function of the user.

As mentioned earlier, modem digital cellular phones include an advanced speech codec, such as a RPE-LTP-codec as described above, which is used in the GSM full-rate speech coding algorithm, or a CELP-codec (Code Excited Linear Prediction) also used in several international standards, or any other speech codec which is able to derive values for parameters that represent the characteristics of the input speech and vice versa. As an example of a device, where the invented method can be implemented, is a digital cellular phone according to the GSM (Global System for Mobile Communications). The functions of a cellular phone are illustrated with the block diagram of FIG. 3.

The first step of the transmission sequence is to digitize 301 and to to encode 302 the speech. The sampling with the A/D converter 301 is made at 8 kHz, and the speech encoding algorithm presumes the input signal to be 13 bit linear PCM. Samples from the A/D converter are segmented into speech frames of 160 bits each, so that the length of each frame is 20 ms. The speech encoder 302 processes speech frames with a length of 20 ms, i.e. the buffer receives 20 ms of speech before the encoding begins. Encoding operations are made on each frame, or on their subframes (blocks of 40 bits). The encoding in the speech encoder 302 results in 260 bits for one frame.

Figure 3:
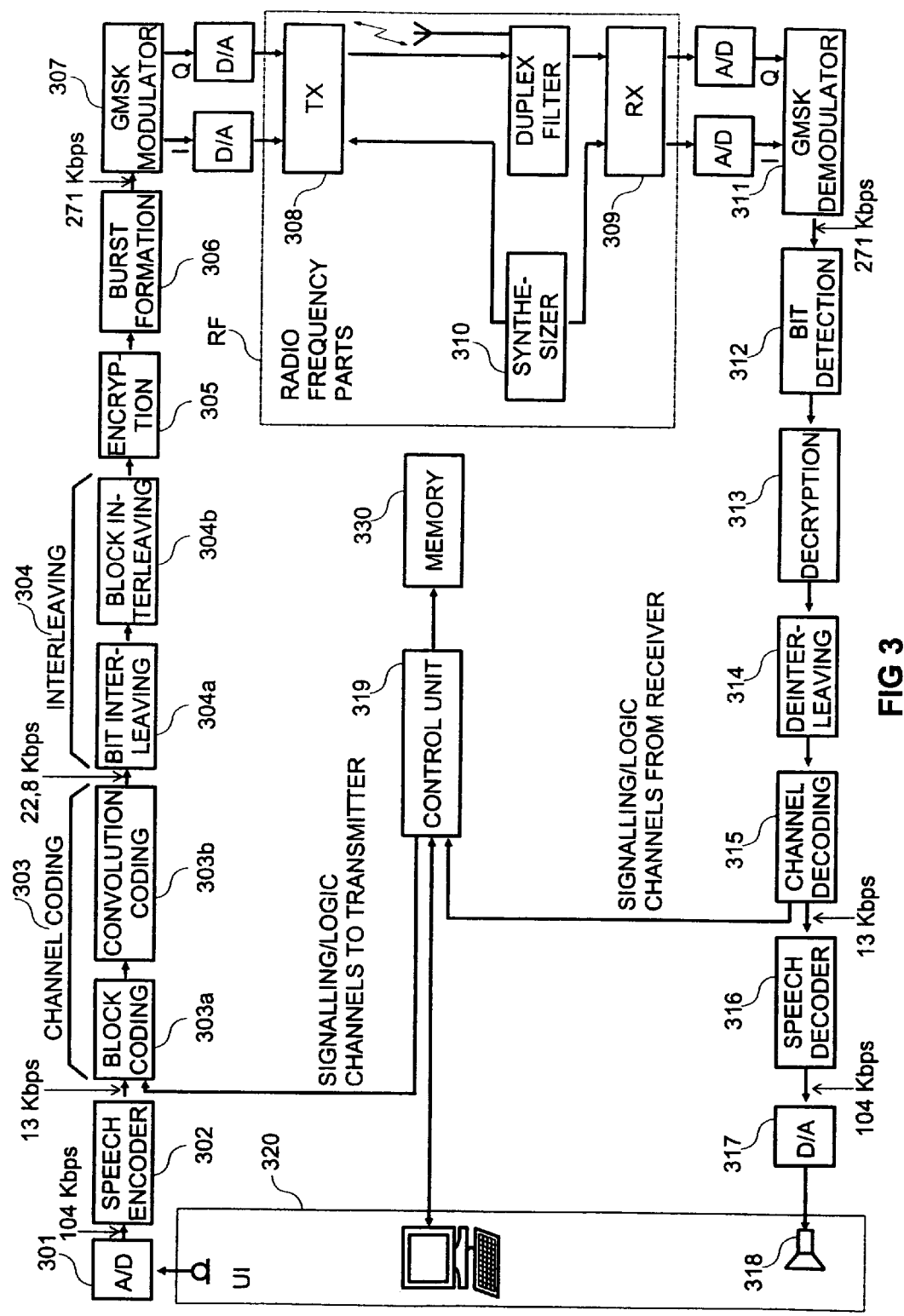
FIG. 3 shows a block diagram illustrating a basic configuration of a cellular phone.

After speech encoding 302 channel encoding 303 is made in two steps, so that first (260 bits) a part of the bits (the 50 most important) are protected by a block code 3a (=CRC, 3 bits), and then these and the next most important bits (132) are further protected by a convolution code 303b (encoding ratio 1/2) ((50+3+132+4)*2=378), and a part of the bits (78) are taken without protection. As shown in FIG. 3, the block encoding section 303a receives signaling and logic messages directly from the control unit 319 which controls the telephone sections, and thus of course these information messages are not speech encoded. In a corresponding way the signaling and logic messages received at the reception, are supplied from the channel decoding section 315 to the control unit. In the block encoding 303a a bit sequence is added at the end of the speech frame, whereby this bit sequence enables the detection of transmission errors at the reception. The convolution encoding 303b increases the redundancy of the speech frame. Thus in total 456 bits are transmitted for each frame of 20 ms.

These 456 bits are interleaved 304, and the interleaving also comprises two steps. First 4a the bits are shuffled and arranged in eight blocks of equal size. These blocks are further divided 304b into eight sequential TDMA frames, or the 456 interleaved bits are transmitted in eight time slots on the radio path (57 bits in each time slot). Usually the transmission errors occur as error bursts, and thus the object of the interleaving is to spread the errors evenly over the transmitted data, whereby the channel decoding will operate more efficiently. After de-interleaving the error burst is converted into single error bits, which can be corrected by the channel decoding. The next step in the transmission sequence is the data encryption 305. The encryption is made by an algorithm, which is one of the best kept secrets of the GSM. The encryption prevents unauthorized listening in, which is possible in analog networks.

The encrypted data is formed 306 into a transmission burst by adding to it a training sequence, trailing bits and a protection period. The transmission burst is supplied to a GMSK modulator 307, which modulates the burst for the transmission. The GMSK modulation method (Gaussian Minimum Shift Keying) is a digital modulation method with a constant amplitude, where the information is contained in phase shifts. With the aid of one or several intermediate frequencies the transmitter 308 up-converts the modulated burst to e.g. 900 Mhz, and transmits it through the antenna on the radio path. The transmitter 308 is one of the three radio frequency parts RF. The receiver 309 is the first section on the reception side, and compared to the transmitter 308 it performs the inverse operations. The third RF part is a synthesizer 310, which generates frequencies. The GSM system utilizes frequency hopping, whereby the transmission and receiving frequencies change for each TDMA frame. Frequency hopping improves the connection quality, but imposes strict requirements on the synthesizer 310. The synthesizer 310 must be able to switch very quickly from one frequency to another, in less than one millisecond.

The inverse operations are performed at the reception. After the RF receiver 309 and the demodulator 311 a linear detection 312 is made e.g. by a channel equalizer, which detects the bits in the received samples, in other words, it tries to make out the transmitted bit sequence. After the detection there is decryption 313 and de-interleaving 314, and the detected bits are channel decoded 315 and an error check sum is checked by a cyclic redundancy check (CRC). The channel decoding 315 tries to correct bit errors occurring during the transmission of a burst. After the channel decoding 315 the speech frame of 360 bits will contain the transmitted parameters which describe the speech and with which the the speech decoder 316 regenerates the digital samples of the speech signal. The samples are D/A-converted 317 to be reproduced by the speaker 318.

The transmitter/receiver has a control unit 319, which is the central unit controlling the mobile station, and which controls substantially all sections 301 to 318, coordinates their operation and controls the timing. The control unit 319 usually comprises a microprocessor, for example. Connected to the control unit is a memory 320 providing both a working memory for storing data during operation and a fixed memory for permanent storage of relevant data.

In addition to previously mentioned elements the transmitter/receiver comprises a User Interface 320 consisting e.g. a keyboard 321, a screen 322, a microphone 333 and a loudspeaker 334.

Figure 4:
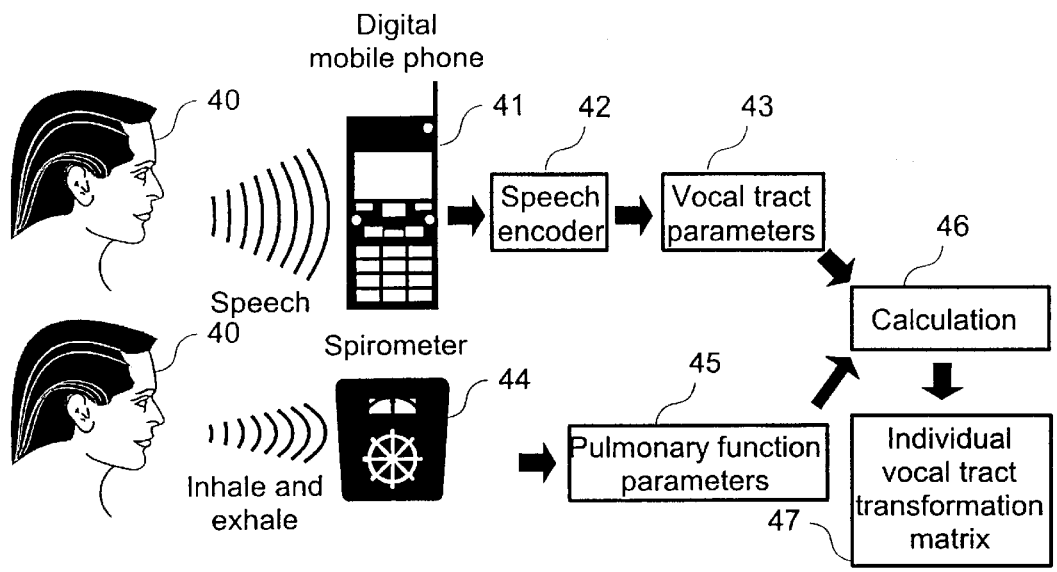
FIG. 4 shows a block diagram illustrating the principle of finding a mathematical relation between two different types of parameters.
Figure 6:
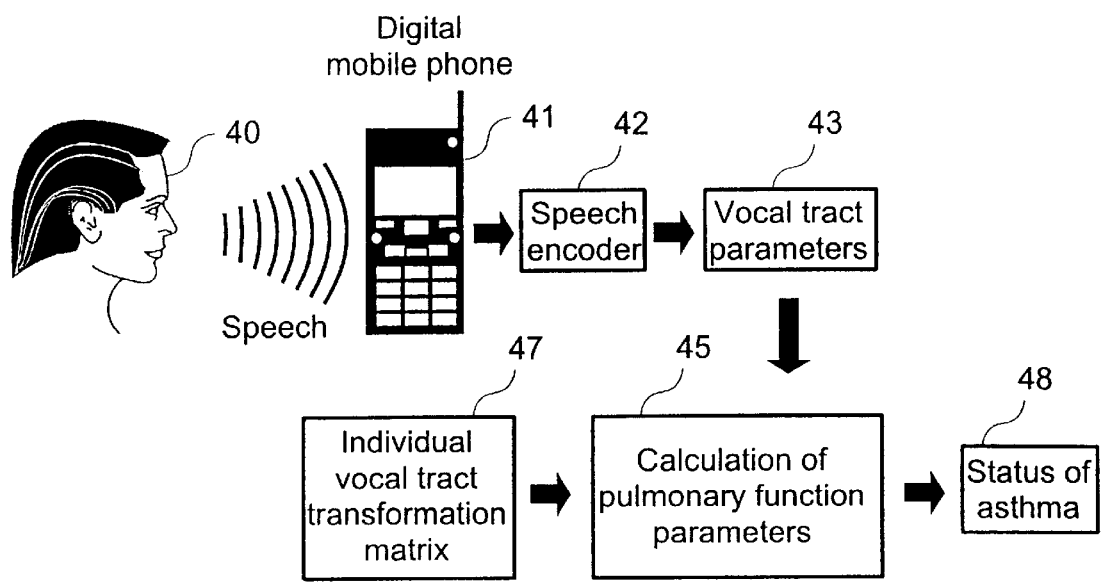
FIG. 6 shows a block diagram of an analysis according to the invention.

Based on the earlier description of the elements, the block diagrams of FIGS. 4 and 6 illustrate a preferred embodiment of the invented solution, where the parameters generated by a speech encoder are utilized to observe the present status of the pulmonary function of the user. At first a mathematical mapping between the vocal tract parameters and the pulmonary function parameters is derived, and then said mapping is used to calculate certain pulmonary function parameters on basis of defined vocal tract parameters.

When a person gets asthma symptoms, it will affect the air flow in different parts of bronchus and thus also the values of the pulmonary function parameters. The same symptoms will also change the overall vocal tract that creates sounds and phonemes of speech. Referring to FIG. 4, when the user 40 speaks to his device 41 (e.g. mobile phone) containing a speech codec, the device 41 transforms the input speech from analog to digital form, performs speech coding 42 on the derived digital signal, and by or instead of transmitting speech coding parameters over the radio path, provides values of certain parameters 43 for further analysis. When the analysis is carried out in the device itself, said values are provided locally. With reference to FIG. 3 this can be accomplished by diverting the bit stream from speech encoder 302 to the control unit 319, using software or hardware solutions familiar to a person skilled in the art. The case where values of the parameters are processed in a remote location are discussed later in more detail.

At the same time with defining values for the speech coding parameters, the individual will use a conventional measuring device 44 e.g. spirometer to obtain the corresponding pulmonary function parameters 45 describing the status of user's pulmonary function. Such parameters can be e.g. vital capacity (VC), forced vital capacity (FVC), peak expiratory flow (PEF), forced expiratory flow (PEF), forced expiratory flow over one second and three seconds (FEV1 and FEV3), and maximal expiratory flow when 25%, 50% or 75% of forced vital capacity remains to be expired (MEF25, MEF50 and MEF75).

Both these procedures are repeated in different asthma conditions so that a sufficient scale of different asthma situations are covered. Thereafter, these two sets are processed 46 using certain mathematical methods e.g. singular value decomposition for generalized matrix inversion (Press, W. H., Teukolsky, S. A., Vetterling, W. T., Flannery B. P., 1992, 'Numerical Recipes in C: The Art of Scientific Computing', 2nd edition, Cambridge University Press, pp.59–70), to find the mathematical relation 47 between the set of vocal tract parameters and the set of pulmonary function parameters e.g. an user-specific transformation matrix to be stored for further analysis.

To illustrate the principle of mapping the pulmonary function parameters with the speech coding parameters of a user, a simplified example is presented. In this example, a connection between PEF values and earlier disclosed RPE-LTP-parameters LAR(i) representing the non-quantized log area ratios, and Nj representing the non-quantized LTP lag provided by a full rate GSM speech codec is derived.

The person suffering from asthma measures his PEF values in three different asthma conditions and gets the following PEF values: $p_1$, $p_2$ and $p_3$. At the same time he utters a chosen test word to his mobile phone, which has been set to a mode where the speech coding parameters from the speech encoder are directed locally to the control unit for further processing. The test word is uttered several times, so that the averaged value m(LAR(i)) of the generated parameters LAR(i) can easily be defined. In case the order of magnitude of the elements varies a lot, the measured values can be transformed to the same order of magnitude by logaritmic operations. The determined and measured parameters can be presented in the following form:

| PEF | m(LAR(1)) | m(LAR(3)) | m(Nj) |
| --- | --- | --- | --- |
| $p_1$ | $m(LAR(1))_1$ | $m(LAR(3))_1$ | $m(Nj)_1$ |
| $p_2$ | $m(LAR(1))_2$ | $m(LAR(3))_2$ | $m(Nj)_2$ |
| $p_3$ | $m(LAR(1))_3$ | $m(LAR(3))_3$ | $m(Nj)_3$ | which enables us to create a set of linear equations:

$$m(LAR(1))_1 \times C1 + m(LAR(3))_1 \times C2 + m(Nj)_1 \times C3 = p_1$$

$$m(LAR(1))_2 \times C1 + m(LAR(3))_2 \times C2 + m(Nj)_2 \times C3 = p_2$$

$$m(LAR(1))_3 \times C1 + m(LAR(3))_3 \times C2 + m(Nj)_3 \times C3 = p_3$$

The coefficients C1, C2 and C3 can be solved using normal mathematical methods. Using the matrix convention, the set of linear equations can be described as $$\underline{A} \times \underline{C} = \underline{PEF} \qquad (1)$$

where $$\underline{A} = \begin{pmatrix} m(LAR(1))_1 & m(LAR(3))_1 & m(Nj)_1 \\ m(LAR(1))_2 & m(LAR(3))_2 & m(Nj)_2 \\ m(LAR(1))_3 & m(LAR(3))_3 & m(Nj)_3 \end{pmatrix}$$

$$\underline{C} = \begin{pmatrix} C1 \\ C2 \\ C3 \end{pmatrix}, \text{ and}$$

$$\underline{PEF} = \begin{pmatrix} p_1 \\ p_2 \\ p_3 \end{pmatrix}.$$

The vector C can be solved as follows:

$$\underline{C} = \underline{A}^{-1} \times \underline{PEF} \qquad (2)$$

if matrix $\underline{A}$ is non-singular ($\det(\underline{A}) \neq 0$) and $\underline{A}^{-1}$ is the inverse of matrix $\underline{A}$.

Given that the patient does the measurements in three different asthma conditions, the exemplary results could be following:

| k | $p_k$ | $m(LAR(1))_k \times 10$ | $m(LAR(3))_k \times 10$ | $m(Nj)_k \times 10^{-1}$ |
|---|---|---|---|---|
| 1 | 250 | 4 | −7 | 5.5 |
| 2 | 380 | 3 | −5 | 6.4 |
| 3 | 460 | 1 | −6 | 7.2 | yielding coefficients C1=−16.43 C2=19.96 and C3=82.81 for that particular patient.

In practise, the number of PEF measurements and also the number of speech coding parameter sets is m which is typically higher than the number of unknown terms Ci. In that case we have $\underline{A}_{m \times n}$, where m>n, and the set of linear equations becomes:

$$\underline{A}_{m \times n} \times \underline{C}_{n \times 1} = \underline{PEF}_{m \times 1} \quad (3)$$

In this case, the coefficient vector $\underline{C}_{n \times 1}$ can be solved as follows:

$$\underline{C}_{n \times 1} = (\underline{A}^T \underline{A})^{-1} \underline{A}^T \times \underline{PEF}_{n \times 1} \quad (4)$$

where $(\underline{A}^T \underline{A})^{-1} \underline{A}^T$ is also called the generalized inverse of matrix $\underline{A}$.

Figure 5:
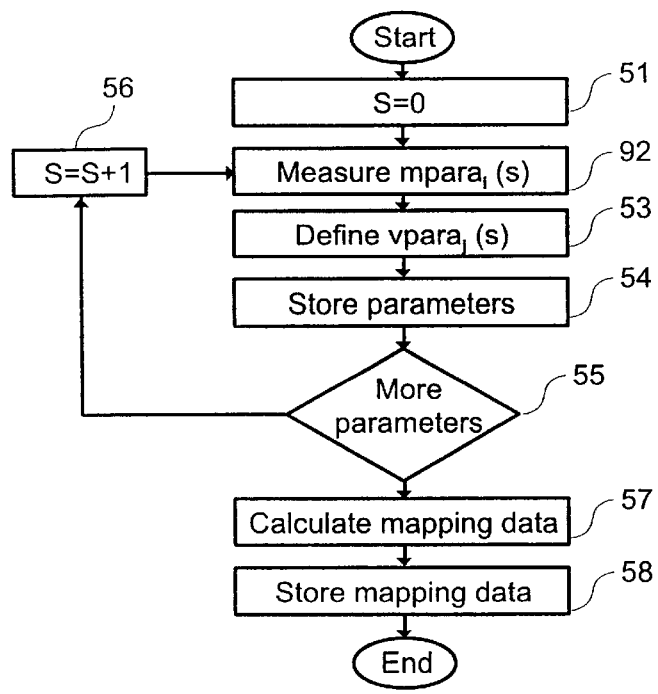
FIG. 5 shows a flow chart illustrating a method of finding a mathematical relation between different types of parameters.

The flow chart of FIG. 5 further illustrates steps for obtaining the user-specific mathematical relation between vocal tract parameters and pulmonary function parameters of a user. In FIG. 5 parameter s denotes the asthma status state, distinguishing each of the states applied during the mapping, $mpara_i(s)$ denotes the value of a pulmonary function parameter i at state s, and $vpara_j(s)$ denotes the value of a vocal tract parameter j at states s. The first status to study is chosen (step 51) and the values of pulmonary function parameters $mpara_i(s)$ are measured with conventional methods (step 52), e.g. with a spirometer. Virtually at the same time values of the vocal tract parameters $vpara_j(s)$ are defined with the help of a device, which comprises a speech processor and which is arranged to output values of certain speech coding parameters for further processing (step 53). The measured values of pulmonary function parameters associated to this status are stored together with the generated values of speech coding parameters for analysis (step 54). After this it is checked whether more states need to be studied (step 55). The amount of calibration measurements needed depends at least on the mathematical method used for deriving the mapping between these two types of parameters and the number of parameters to be used for monitoring purposes.

If more measurements are needed, the asthma status of the user is changed e.g. with the help of medication, and when the status has altered enough, a measurement connected to this next status is started (step 56). In case all necessary calibrating information is already available, a calculation is implemented to find the mathematical relation between values of these two types of parameters (step 57). This mathematical relation can be for example the user-specific vocal tract transformation matrix $\underline{C}$ as explained earlier. The calculated mathematical relation will be stored in the memory to be used later in the analysis stage.

The described method for deriving the user-specific mathematical relation is given as a way of example only. Another recommended way to establish said relation is to use neural networks, for example three-layer perceptron neural networks, which are described in more detail e.g. in "The Electrical engineering Handbook", CRC Press, 1993, pp 420–423. Perceptrons learn the associations between input and output patterns by being exposed to many "lessons". The learning law for the perceptron is a simple error feedback and the topology of the network is feedforward multilayer. Any unknown process can be modeled by the perceptron as long as there are many input/output training pairs available.

After the user-specific mathematical relation has been derived, it can be used in reverse order to calculate the pulmonary function parameters on the basis of the vocal tract parameters output from a similar speech encoder as was used in said mapping phase. The block diagram of FIG. 6 illustrates the principle of this procedure. When the user 40 wishes to do the measurement, he speaks to his device 41, e.g. mobile phone. The device 41 transforms the input speech from analog to digital form, performs speech encoding 432 on the derived digital signal, and provides values of speech coding parameters 43 locally for further analysis. The stored mathematical relation, e.g. the user-specific vocal tract transformation matrix 47 is retrieved from the memory and utilized in the calculation of corresponding pulmonary function parameters 45 according to equation (1). Based on these calculated parameters, the present status of user's asthma can be estimated 48.

Figure 7:
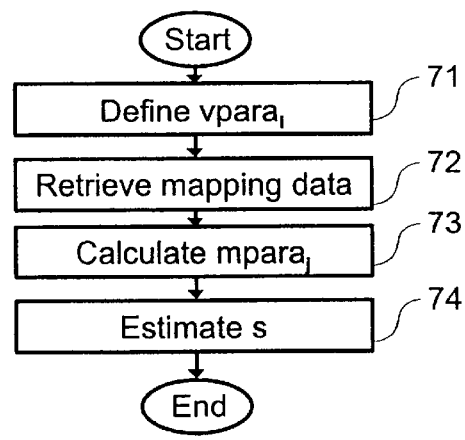
FIG. 7 shows a flow chart illustrating a preferred embodiment of the invented solution.

The steps for using values for speech coding parameters generated by the speech encoder are presented with the block diagram of FIG. 7. The user speaks to his device, and the speech encoder comprised in the device generates and outputs values for certain speech coding parameters $vpara_j(s)$ from said speech (step 71). The user-specific mathematical relation is retrieved from the memory (step 72), and values of the associated pulmonary function parameters $mpara_i(s)$ are calculated (step 73). Based on the calculated pulmonary function parameters, the status s of the user's pulmonary function can be estimated (step 74).

As explained with reference to FIG. 1, several different parameters describing different features of the speech can be extracted from the speech encoder. They may be directly the parameters produced as end results or intermediate results in the speech encoding process. In addition, they may also be some parameters that have been further calculated from those parameters, either alone or in combination with the original speech signal. In the case of the described RPE-LTP-encoder, the parameters for the feature vectors of pattern recognition would preferably be:

LPC coefficients (symbol r in FIG. 1),
LTP parameters (symbols $N_o$ and $b_o$ in FIG. 1),
FFT spectrum calculated from the LPC residual signal (symbol d in FIG. 1),
some other parameters from the LPC residual signal,
parameters from the LPC residual signal calculated using true LPC coefficients (symbol r) instead of the quantized coefficients (symbol r').

Some other parameters like cepstral coefficients may also be used. The set of parameters used in analysis and monitoring is selected according to the system and application used, preferably after careful clinical experimenting and statistical analysis. If e.g. another type of codec is used, the choice of parameters is adjusted according to the configuration of the application.

The vocal tract parameters are preferably calculated for certain phonemes that are mostly affected by changes in the pulmonary function, and thus convey most information related to asthma symptoms. Furthermore, the set of parameters best revealing the status of user's pulmonary functions may vary individually. Therefore also user-specific settings may be necessary, e.g. in the form of user-specific reference word or reference phonemes selected for the analysis.

The parameters used in an ordinary speech encoder of a mobile station are chosen to provide good transmission characteristics. In asthma monitoring the accuracy of analyses could be enhanced by a different choice of parameters, encoding speed and bitrates. To achieve this, a modified speech encoder can also be used for asthma monitoring purposes. Such speech encoder can be the ordinary encoder of a mobile station used in a mode where smaller number of parameters is generated but higher accuracy is used. Such speech encoder can also be an ordinary encoder of a mobile station used in two different modes where different sets of values of parameters corresponding to the operating mode are generated. Even a solution, where the device comprises two separate speech encoders utilized for different functions is possible.

Figure 8:
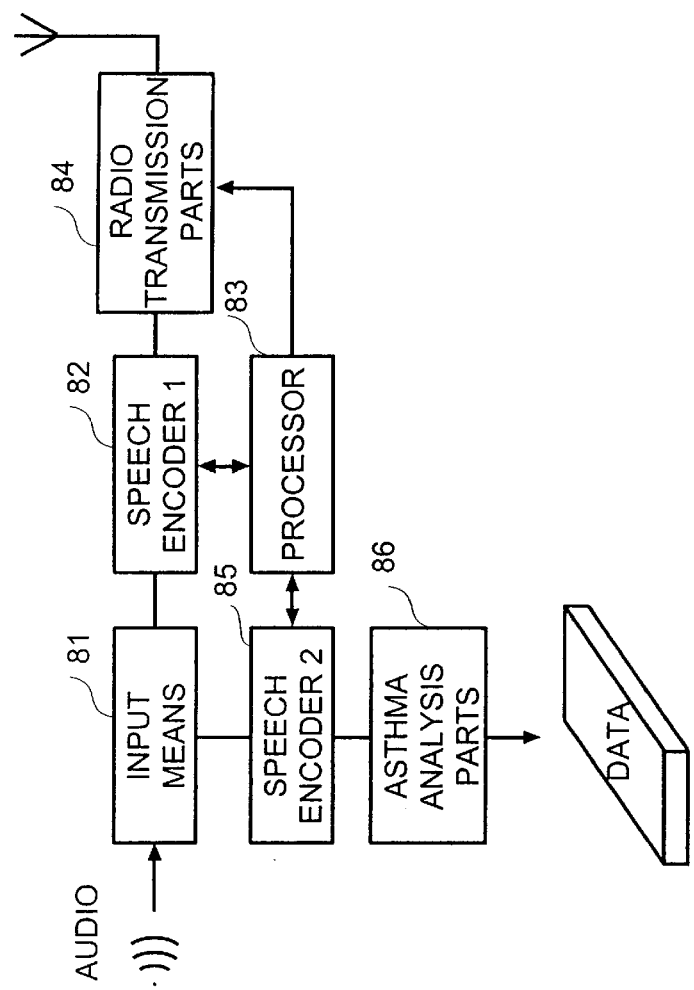
FIG. 8 shows a block diagram illustrating a basic configuration of a modified speech encoder.

The principle of one of such configurations is illustrated in FIG. 8. The mobile station comprising two functionally different speech encoders is run in two different operating modes, a mode for normal telecommunication and a mode for asthma monitoring purposes. Through e.g. menu-driven software, the user chooses the mode in which the device is going to be operated i.e. whether he wishes to use the device as a conventional communication device or for asthma monitoring purposes. If the user chooses the mobile station mode, the data from input means 81 is directed to speech encoder 1 which, controlled by the processor 83, follows the conventional procedure of radio transmission. If the user chooses the asthma analysis mode, data from input means 81 is directed to speech encoder 2 which, controlled by the processor 83, continues the invented process of utilizing the parameters generated by speech encoder 2 for estimating the values for certain pulmonary tract parameters. When the analysis is completed, the user may return back to the normal radio transmission mode.

In the embodiments described earlier, the analysis was performed locally utilizing the speech encoder, memory and processor available in the device itself. In the case of e.g. a modem digital cellular phone these resources already present an effective tool for most monitoring needs. Anyhow, the communication link provided by the cellular network will further widen the possibilities for monitoring and analysis purposes made available by the invention.

Figure 9:
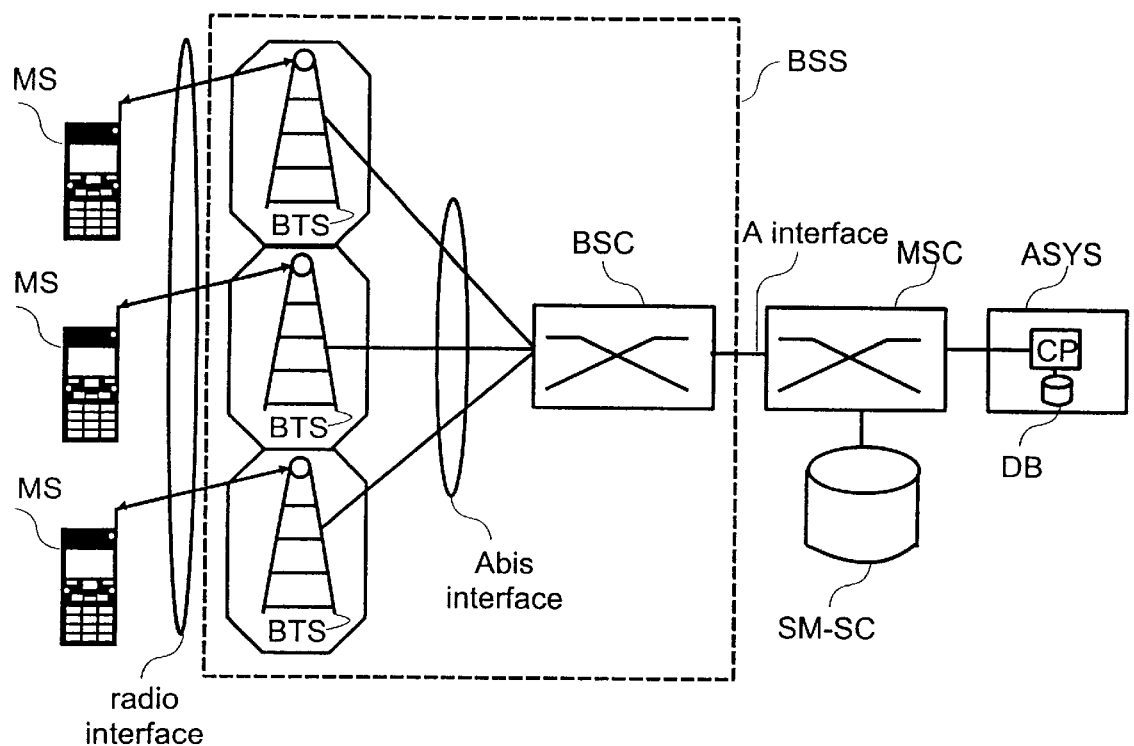
FIG. 9 shows a block diagram representing the elements of a system according to the invention.

An exemplary structure of a network and the implementation of the invented method is presented in FIG. 9 in connection of GSM (Global System for Mobile Telecommunications) network. In this embodiment parameters generated by the speech encoder of the device are transmitted over a telecommunication network to a remote asthma monitoring system where the actual analysis based on said speech coding parameters is accomplished. In this case, the asthma monitoring device of the user is a mobile station MS of a telecommunication network, which is connected to base stations BTS by means of radio link. The base stations BTS are further connected, through a so-called Abis interface, to a base station controller BSC, which controls and manages several base stations. The entity formed by a number of base stations BTS (typically, by a few dozen base stations) and a single base station controller BSC, controlling the base stations, is called a base station system BSS. The base station controller BSC is connected through a so-called A interface, to a mobile services switching center MSC, which co-ordinates the formation of connections both from and to mobile stations. A further connection is made, through the mobile service switching center MSC, to outside the mobile communications network. An optional short message service center SM-SC is generally coupled to the mobile services switching center MSC.

Through a telecommunication link a remote monitoring system SYS is connected to the MSC of the network. SYS comprises a database DB, where the user-specific mapping data regarding system users is stored. When the users speaks to his MS, the uplink bitstream transmitted from the MS to BTS normally comprises the generated speech coding parameters generated to the network. Instead of transferring the received data normally, a network element e.g. BSC, knowing that the received data is associated with asthma analysis, transfers the values of the speech coding parameters through the network to SYS. The network element BSC can be informed that the received data is associated with asthma analysis by a prior user command transmitted over the radio path, or the received data can include a flag indicating the data being associated with asthma analysis. As a response to SYS receiving values of certain speech coding parameters, an analysis according to the invention (cf. FIG. 6) can be initiated in the central processing unit CP of SYS.

With the above described configuration, even more comprehensive and long-term asthma monitoring services can be realized. The vocal tract parameters generated by the speech encoder can be used for analysis performed in the device itself, but whenever a telecommunication link is available, the generated data can also be transmitted right away to a database of a larger monitoring system for further processing. The data can be transmitted in a normal circuit-switched mode, new packet data radio transmission services (e.g. General Packet Radio System, GPRS) can be utilized, or the short messaging features (e.g. GSM SMS) of the telecommunication link can be used. It is also possible to collect data into a data logger during the day and then connect it to a PC in the evening. The exact implementation of the communication link between the monitoring device and the database is not essential to the implementation.

The frequently collected extensive information on parameters, which indicate the status of the pulmonary function of the user offer a wide material for statistical analysis. Speech signal typically fluctuates much, but by applying simple filtering or averaging methods, the effect of the short term fluctuations can be eliminated and the long term trends in the in the asthma status can be revealed. Utilizing the proposed system, it is even possible to follow the trends of some parameters continually each time the person speaks to his mobile phone. Assuming the phoneme "a" would create such vocal tract parameters that are relevant from the pulmonary function analysis point of view, the system can be arranged to identify the phoneme "a" from the uplink bitstream (transmission from MS to BTS) and store the relevant speech coding parameters each time the phoneme "a" is uttered by the user, even during normal phone calls. This functionality can be implemented in the device itself or it can be carried out in some network element e.g. BSC. By utilizing these values for performing constant analysis, development of chosen parameters and therefore the by the user-specific mathematical relation associated pulmonary functions can be followed in real time.

By linking the collected data with some other information, it is also possible to analyze correlation between different factors related to asthma symptoms, and to draw conclusions based on found causal effects. This related data can be given by the user himself (personal feelings, symptoms, medication, observed risk factors etc) with the help of a prompting software incorporated in the device, and/or it can be collected from several outside databases (weather data, pollen and air quality information, etc). This would avail valuable information as well for medical personnel involved with treating the patient as for persons involved with scientific research.

In the examples given before, the mathematical connection was made between the measured pulmonary function parameters and generated speech coding parameters. The principle of the invention can be utilized also for estimating other conditions affecting the speech of a person, whenever parameters describing such conditions can be established. Such a condition could be e.g. influence of alcohol, influence of a certain medication etc.

Although the invention has been shown and described in terms of a preferred embodiment, those persons of ordinary skill in the art will recognize modifications to the preferred embodiment may be made without departure from the scope of the invention as claimed below.

What is claimed is:

1. A method for estimating the status of at least one of a physiological and psychological condition of a user, wherein:

taking speech samples from the user and processing said samples into an input audio signal;

generating a set of values of speech coding parameters from said input audio signal, said speech coding parameters representing characteristics of said input audio signal;

applying a user specific mathematical relation to calculate values for parameters of said condition from said set of values of speech coding parameters; and estimating the status of said condition based on said calculated values of said condition parameters.

2. A method according to claim 1, wherein said calculation is carried out locally in a device comprising a speech encoder.

3. A method according to claim 1 or 2, wherein the method further comprises transmitting the locally generated set of values of speech coding parameters to a remote monitoring system via a telecommunication link for said calculation of values of said condition parameters.

4. A method according to claim 3, wherein said transmission is carried out as a response to a user command to estimate the status of said condition.

5. A method according to claim 1, wherein said set of values of speech coding parameters is collected from normal uplink bitstream by a network element (BSC).

6. A method for estimating the status of at least one of a physiological and psychological condition of a user, wherein taking speech samples from the user and processing said samples into an input audio signal;

generating a set of values of speech coding parameters from said input audio signal, said speech coding parameters representing characteristics of said input audio signal;

applying a user specific mathematical relation to calculate values for parameters of said condition from said set of values of speech coding parameters;

estimating the status of said condition based on said calculated values of said condition parameters;

wherein said condition is the condition of user's pulmonary function, and the method further comprises the steps of measuring values of chosen pulmonary function parameters in a number of different asthma conditions;

taking speech samples virtually simultaneously with said measurements and processing said samples into input audio signals;

generating a set of values for certain speech coding parameters from said input audio signals; and deriving a user-specific mathematical relation between said values of pulmonary function parameters and values of speech coding parameters.

7. A method for estimating the status of at least one of a physiological and psychological condition of a user, wherein taking speech samples from the user and processing said samples into an input audio signal;

generating a set of values of speech coding parameters from said input audio signal, said speech coding parameters representing characteristics of said input audio signal;

applying a user specific mathematical relation to calculate values for parameters of said condition from said set of values of speech coding parameters; wherein the mathematical relation is a user-specific transformation matrix $C_{n \times k}$ derived from the equation:

$$A_{m \times n} \times C_{n \times k} = B_{m \times k}$$

the matrix $A_{m \times n}$ consisting of n values of m speech coding parameters and matrix $B_{m \times k}$ consisting of m generated values of k associated speech coding parameters; and estimating the status of said condition based on said calculated values of said condition parameters.

8. A method for estimating the status of at least one of a physiological and psychological condition of a user, wherein taking speech samples from the user and processing said samples into an input audio signal;

generating a set of values of speech coding parameters from said input audio signal, said speech coding parameters representing characteristics of said input audio signal, wherein said speech coding parameters comprise at least one of the following parameters of an RPE-LTP speech encoder: LPC coefficients, LTP parameters, FFT spectrum calculated from the LPC residual signal, parameters from the LPC residual signal, parameters from the LPC residual signal calculated using true LPC coefficients instead of the quantized coefficients;

applying a user specific mathematical relation to calculate values for parameters of said condition from said set of values of speech coding parameters; and estimating the status of said condition based on said calculated values of said condition parameters.

9. A device (MS) for estimating the status of at least one of a physiological and psychological condition of a user, wherein the device comprises:

input means (21; 320, 301) for receiving input speech and transforming it into input audio signal;

a speech encoder (22; 302) for generating a set of values of speech coding parameters from said input audio signal, said speech coding parameters representing characteristics of said input audio signal;

a memory (23; 330) for storing data on a user-specific mathematical relation between parameters of said condition and speech parameters;

a processor (24; 319) for applying said user-specific mathematical relation to calculate values of said condition parameters from said set of values of speech coding parameters; and output means (25; 320) for providing the resulting calculated values of certain condition parameters for estimation of the status of the user's condition.

10. A device according to claim 9, wherein the device also comprises means (303–318) for functioning as a mobile station in a telecommunication network.

11. A device according to claim 10, wherein the device is arranged to, as a response to a user command, direct said speech coding parameters locally to said processor (319) to be used for estimation of said condition.

12. A device according to claim 9 or 10, wherein the speech encoder (302) comprises two functional units (82, 85), a first unit (82) for generating speech coding parameters for normal transmission over the radio path, and a second unit (85) for generating speech coding parameters for monitoring purposes.

13. A device (MS) for estimating the status of at least one of a physiological and psychological condition of a user, wherein the device comprises:
   input means (21; 320, 301) for receiving input speech and transforming it into input audio signal;
   a speech encoder (22; 302) for generating a set of values of speech coding parameters from said input audio signal, said speech coding parameters representing characteristics of said input audio signal;
   a memory (23; 330) for storing data on a user-specific mathematical relation between parameters of said condition and speech parameters, wherein said condition is the condition of user's pulmonary function;
   a processor (24; 319) for applying said user-specific mathematical relation to calculate values of said condition parameters from said set of values of speech coding parameters; and
   output means (25; 320) for providing the resulting calculated values of certain condition parameters for estimation of the status of the user's condition.

14. A system for estimating the status of at least one of a physiological and psychological condition of a user, wherein said system comprising:
   a plurality of monitoring devices (MS) comprising
      input means (21; 320, 301) for receiving input speech and transforming it into input audio signal, and
      a speech encoder (22; 302) for generating a set of values for speech coding parameters from said input audio signal, said speech coding parameters representing characteristics of said input audio signal;
   a central monitoring unit (SYS) comprising
      a database (DB) for storing data on a user-specific mathematical relation between parameters representing said condition and speech parameters, separately defined for each user,
      a processing unit (CP) for, as a response to a received set of values for certain speech coding parameters, retrieving the user-specific mathematical relation from the database (DB) and applying said relation to calculate the values of chosen condition parameters from said set of values for chosen speech parameters;
      an estimation unit (SYS) for, as a response to the calculated values of chosen condition parameters, producing an estimate on the status of condition of the user.

15. A system according to claim 14, wherein the processing unit (CP) is arranged to calculate the user-specific mathematical relation from given values of said condition parameters and speech coding parameters.

16. A system according to claim 14, wherein the link between the elements comprises a cellular digital network, and the monitoring device comprises a mobile station (MS) of said network.

17. A system according to claim 14, wherein said central monitoring unit (SYS) is connected to the mobile switching center of the network (MSC).

18. A system according to claim 14, wherein said central monitoring unit (SYS) is situated in a remote location and can also be accessed by authorized third parties.

19. A system according to claim 14, wherein said central monitoring unit (SYS) is arranged to constantly survey said calculated values of pulmonary function parameters, and in case of observed emergency situation, initiate a necessary rescue operation.

20. A system for estimating the status of at least one of a physiological and psychological condition of a user, wherein said system comprising:
   a plurality of monitoring devices (MS) comprising:
      input means (21; 320, 301) for receiving input speech and transforming it into input audio signal,
      a speech encoder (22; 302) for generating a set of values for speech coding parameters from said input audio signal, said speech coding parameters representing characteristics of said input audio signal;
   a central monitoring unit (SYS) comprising:
      a database (DB) for storing data on a user-specific mathematical relation between parameters representing said condition and speech parameters, separately defined for each user, wherein said condition is the condition of user's pulmonary function;
      a processing unit (CP) for, as a response to a received set of values for certain speech coding parameters, retrieving the user-specific mathematical relation from the database (DB) and applying said relation to calculate the values of chosen condition parameters from said set of values for chosen speech parameters;
      an estimation unit (SYS) for, as a response to the calculated values of chosen condition parameters, producing an estimate on the status of condition of the user.

21. A method for estimating the status of at least one of a physiological and psychological condition of a user, wherein
   taking speech samples from the user and processing said samples into an input audio signal;
   generating a set of values of speech coding parameters from said input audio signal, said speech coding parameters representing characteristics of said input audio signal;
   applying a user specific mathematical relation to calculate values for parameters of said condition from said set of values of speech coding parameters;
   estimating the status of said condition based on said calculated values of said condition parameters;
   wherein said condition is the condition of user's physiological and psychological function, and the method further comprises the steps of
      measuring values of chosen physiological and psychological function parameters in a number of different pulmonary conditions;
      taking speech samples virtually simultaneously with said measurements and processing said samples into input audio signals;
      generating a set of values for certain speech coding parameters from said input audio signals; and
      deriving a user-specific mathematical relation between said values of physiological and psychological function parameters and values of speech coding parameters.

22. A method for estimating the status of at least one of a physiological and psychological condition of a user, wherein taking speech samples from the user and processing said samples into an input audio signal;

generating a set of values of speech coding parameters from said input audio signal, said speech coding parameters representing characteristics of said input audio signal, wherein said speech coding parameters comprise at least one of the following parameters of speech encoder: LPC coefficients, LTP parameters, FFT spectrum calculated from the LPC residual signal, parameters from the LPC residual signal, parameters from the LPC residual signal calculated using true LPC coefficients instead of the quantized coefficients;

applying a user specific mathematical relation to calculate values for parameters of said condition from said set of values of speech coding parameters; and estimating the status of said condition based on said calculated values of said condition parameters.

* * * * *